(12) United States Patent
Bobba et al.

(10) Patent No.: US 8,685,299 B2
(45) Date of Patent: Apr. 1, 2014

(54) BLOW MOLDED ENERGY ABSORBER AND SYSTEMS AND METHODS OF MAKING AND USING THE SAME

(75) Inventors: Somasekhar Venkat Bobba, Bangalore (IN); Dinesh Mana, Bangalore (IN); Dhanendra Kumar Nagwanshi, Bangalore (IN); Kent Allen, Royal Oak, MI (US); Matthew Douglas Marks, Waterford, MI (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 13/586,081

(22) Filed: Aug. 15, 2012

(65) Prior Publication Data

US 2012/0304445 A1    Dec. 6, 2012

Related U.S. Application Data

(62) Division of application No. 12/971,000, filed on Dec. 17, 2010.

(51) Int. Cl.
*B28B 11/14* (2006.01)

(52) U.S. Cl.
USPC ............ 264/157; 264/523; 264/527; 264/138

(58) Field of Classification Search
None
See application file for complete search history.

(56) References Cited

U.S. PATENT DOCUMENTS

| | | | |
|---|---|---|---|
| 4,028,034 A * | 6/1977 | Hahn | ............................ 425/527 |
| 6,082,792 A | 7/2000 | Evans et al. | |
| 6,126,533 A | 10/2000 | Johnson et al. | |
| 6,179,737 B1 | 1/2001 | Adler | |
| 6,866,331 B2 | 3/2005 | Kropfeld | |
| 6,907,391 B2 | 6/2005 | Bellora et al. | |
| 7,044,514 B2 | 5/2006 | Mustafa et al. | |
| 7,096,986 B2 | 8/2006 | Borroni-Bird et al. | |
| 7,152,311 B2 | 12/2006 | Beroz et al. | |
| 7,163,243 B2 | 1/2007 | Evans | |
| 7,222,896 B2 | 5/2007 | Evans | |

(Continued)

FOREIGN PATENT DOCUMENTS

| | | |
|---|---|---|
| JP | 2006247237 A | 9/2006 |
| WO | 2004080765 A1 | 9/2004 |

OTHER PUBLICATIONS

Japanese Patent No. 2006247237 (A); Publication Date: Sep. 21, 2006; Abstract Only; 1 Page.

(Continued)

*Primary Examiner* — Monica Huson
(74) *Attorney, Agent, or Firm* — Cantor Colburn LLP

(57) ABSTRACT

In one embodiment, a vehicle energy absorber system, comprises: blow molded crush lobes that are open on one side, wherein the energy absorber comprises fillets having a fillet radius of less than 20 mm and a thickness of less than or equal to 1.5 mm; a bumper beam adjacent the open side; and a fascia, wherein the energy absorber is located between the fascia and the bumper beam. In one embodiment, a method for making a blow molded energy absorber comprises: introducing a molten plastic to a first mold cavity; introducing gas into the plastic to conform the plastic to the interior of the first mold cavity and form a first preform; and separating the first preform along a centerline thereof to form open, first preform portions having first crush lobes.

8 Claims, 10 Drawing Sheets

(56) References Cited

U.S. PATENT DOCUMENTS

| | | |
|---|---|---|
| 7,625,036 B2 | 12/2009 | Cormier et al. |
| 7,806,448 B2 | 10/2010 | Allen et al. |
| 2004/0174025 A1 | 9/2004 | Converse et al. |
| 2007/0275242 A1 | 11/2007 | Gopal et al. |
| 2009/0167037 A1 | 7/2009 | Czopek et al. |
| 2009/0256370 A1 | 10/2009 | Siler et al. |
| 2010/0109353 A1 | 5/2010 | Allen et al. |

OTHER PUBLICATIONS

International Search Report; International Application No. PCT/US2011/064211; International Filing Date: Dec. 9, 2011; Date of Mailing: Feb. 27, 2012; 4 pages.

Written Opinion of the International Search Report; International Application No. PCT/US2011/064211; International Filing Date: Dec. 9, 2011; Date of Mailing: Feb. 27, 2012; 6 Pages.

* cited by examiner

BLOW MOLDED ENERGY ABSORBER AND SYSTEMS AND METHODS OF MAKING AND USING THE SAME

CROSS REFERENCE TO RELATED APPLICATIONS

The present application is a divisional of U.S. patent application Ser. No. 12/971,000, filed Dec. 17, 2010, the contents of which are hereby incorporated by reference.

BACKGROUND

The present disclosure relates generally to energy absorbers for use in a vehicle, for example, to reduce injuries (e.g., to occupant(s), pedestrian(s), etc.) and/or to reduce vehicle damage.

Increased importance has been placed on methods for minimizing the amount of injury suffered by a person in an accident as well as the amount of vehicle damage. Different regulatory committees assess automotive pedestrian and occupant impact performance globally. Depending on the overall performance, vehicles are assigned a cumulative safety rating. Each and every component of the vehicle needs to satisfy the specific impact criteria in order to ensure a good overall rating for the vehicle.

Foam energy absorbers are able to meet the pedestrian regulations, but require increased packaging space (e.g., greater than about 80 millimeters (mm)). Metallic energy absorbers are too limiting in terms of the geometries and thicknesses that can be utilized and thus, are not very efficient for pedestrian safety. Automobile manufactures are continually striving to reduce energy absorber component weight and/or reduce the packaging space of components to allow for increased styling freedom while simultaneously providing high performance energy absorber systems. One approach is to lower the energy absorber component weight to provide a lower cost and lower weight solution. However, merely lowering the energy absorber component weight results in a compromise in performance and styling freedom for the front end of the vehicle. Another approach has been to design an energy absorber with a less expensive material or various material configurations to provide a less expensive energy absorber. These material configurations are often inefficient at providing the desired structural integrity for energy absorbers. Still another approach has been to modify the geometrical configuration of an existing energy absorber design. However, this approach has not resulted in a significant weight change. These existing low performance systems generally require large amounts of packaging space to meet the impact regulations. A large packaging space, however, reduces the vehicle styling freedom.

This generates the need to design an energy absorber that will deform and absorb impact energy to ensure a good vehicle safety rating with a decreased weight and lower amount of packaging space resulting in lower cost and increased design freedom. Different components due to their inherent geometry and assembly requirements require different energy absorber designs to satisfy the various impact criteria. Therefore, the automotive industry is continually seeking economic solutions to improve overall safety rating of a vehicle. Hence, there is a continual need to provide a solution which would enhance a vehicle safety rating and/or reduce vehicle damage, while also providing design freedom.

BRIEF DESCRIPTION

Disclosed, in various embodiments, are energy absorbing devices that can be used in conjunction with various vehicle components.

In one embodiment, a blow molded energy absorber comprises: a blow molded first lobe section that has an open cavity on one side, and first crush lobes; and a blow molded second lobe section that has been separated into open, second preform portions that are located at opposite ends of the first lobe section, wherein the second lobe section comprises second crush lobes. The first crush lobes and the second crush lobes are on a first side of the energy absorber.

In another embodiment, a blow molded energy absorber comprises: blow molded crush lobes that are open on one side, wherein the energy absorber comprises fillets having a fillet radius of less than 20 mm and a thickness of less than or equal to 1.5 mm.

In one embodiment, a vehicle energy absorber system comprises: a bumper beam, a blow molded energy absorber, and a fascia. The energy absorber comprises a blow molded first lobe section that has an open cavity on one side and first crush lobes, and a blow molded second lobe section that has been separated into open second preform portions that are located at opposite ends of the first lobe section, wherein the second lobe section comprises second crush lobes. The first crush lobes and the second crush lobes are on a first side of the energy absorber. The energy absorber is located between the fascia and the bumper beam, with the open cavities on a side of the energy absorber adjacent the bumper beam.

In another embodiment, a vehicle energy absorber system, comprises: blow molded crush lobes that are open on one side, wherein the energy absorber comprises fillets having a fillet radius of less than 20 mm and a thickness of less than or equal to 1.5 mm; a bumper beam adjacent the open side; and a fascia, wherein the energy absorber is located between the fascia and the bumper beam.

In one embodiment, a method for making a blow molded energy absorber comprises: introducing a molten plastic to a first mold cavity; introducing gas into the plastic to conform the plastic to the interior of the first mold cavity and form a first preform; and separating the first preform along a centerline thereof to form open, first preform portions having first crush lobes.

These and other non-limiting characteristics are more particularly described below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

Figure 1A:
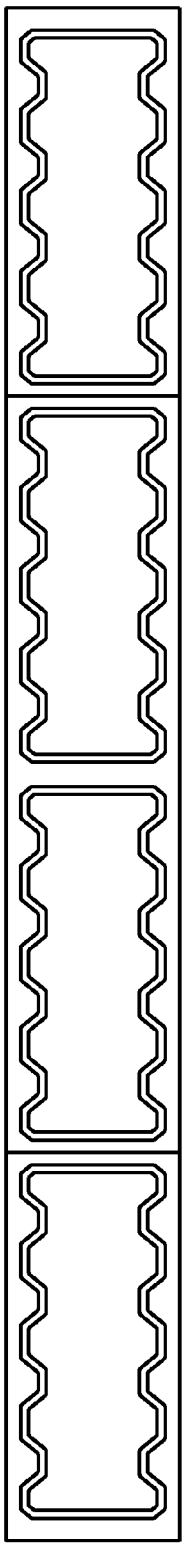
FIGS. 1A and 1B show a front view of an embodiment of a blow molded energy absorber comprising inner lobes and outer lobe sections (FIG. 1A); and an isometric view of an embodiment of a blow molded energy absorber comprising inner lobes and outer lobe sections, disposed between a vehicle's beam and fascia (FIG. 1B).

Disclosed herein, in various embodiments, are energy absorbers comprising a plurality of lobes that are blow molded. The lobes generally comprise a thermoplastic material. The energy absorber, when attached to a bumper beam, offers improved impact performance compared to injection molded or thermoformed energy absorbers. The energy absorber also offers a significant weight reduction (e.g., about 45% to about 50% lighter) as compared to injection molded energy absorbers. The energy absorbers disclosed herein offer a more controlled thickness distribution and a reduction in the number of lobes or fillets spanning the length of the energy absorber as compared to thermoformed energy absorbers. Additionally, the energy absorbers comprising blow molded lobes comprises a smaller corner fillet radius and thickness as compared to thermoformed energy absorbers resulting in a more efficient energy absorber (e.g., about 30% to about 40% more efficient). The energy absorbers disclosed herein also reduce the damage incurred by a vehicle in a vehicle-to-vehicle impact such that the energy absorbers enable the vehicle to meet low speed vehicle damageability requirements. The energy absorbers can utilize lower packing space (e.g., less than 45 millimeters (mm)) while still meeting pedestrian safety impact requirements (e.g., European Enhanced Vehicle-safety Committee (EEVC), European Automobile Manufacturers' Association (ACEA,) Phase II and, and Global Technical Regulations (GTR) along with the other low speed (e.g., 4 kilometers per hour (kmph)) FMVSS part 581, vehicle damageability requirements (e.g., United Nations Economic Commission for Europe (e.g., ECE-42) and Research Council for Automobile Repairs (RCAR), Allianz, Dunner (e.g., at 15 kmph, 10 degree inclined angled barrier hit to vehicle bumper at an outboard location), and Thatcham Impacts) once assembled over the bumper beam. The design of the energy absorber in which sides of a lobe are molded together to form a closed structure and then separated, partially or completely at the center facilitates easily assembly of the energy absorber over the bumper beam.

Several categories of damages and injuries are possible when an automobile accident occurs. One category relates to the safety of pedestrians who may be injured during a vehicle to pedestrian impact event. Another category relates to the damage of the vehicle components when an impact with another vehicle or object occurs. Still another category relates to the injury and safety of vehicle occupants during an impact with another vehicle or object. Injuries and vehicle damage in the latter two categories are generally reduced with the use of a bumper beam, crash cans, airbags, seatbelts, etc. Energy absorbers formulated for pedestrian protection are utilized to assist in reducing the injuries suffered by a pedestrian upon an impact with a vehicle. Generally, energy absorbers are located in front of a bumper beam to protect the pedestrian upon a collision with a vehicle.

Generally, energy absorbers can be processed and formed into the desired shape by injection molding, thermoforming, or blow molding. Injection molding suffers from limitations on the minimum thickness that can be achieved, thus increasing the system mass. Thermoforming suffers from poor control of thickness distribution and a requirement for a large fillet radius resulting in inefficient energy absorbing lobes. Energy absorbers made by blow molding offer the ability to form lobes with thinner walls and smaller fillet radius resulting in a highly efficient energy absorber. For example, the same lobe sizes made with different fillet radius of 5 to 20 mm, were studied. Energy absorber lobes with smaller fillet radius (5 mm) has shown better performance in absorbing energy than the lobes with higher fillet radius (20 mm)). Note, generally for a thermoforming process, a minimum fillet radius of 20 mm was required for the processability, whereas with the blow molding process the energy absorber parts can be processed with smaller fillets, e.g., as small as 7 mm. Also, with blow molding, a thin wall can be attained, e.g., having a thickness of 0.7 mm while still meeting the desired standards.

Exemplary characteristics of the energy absorbing assembly include high toughness/ductility, thermal stability, high energy absorption capacity, a good modulus-to-elongation ratio, and recyclability, among others, wherein "high" and "good" are intended to mean that the characteristic at least meets vehicle safety regulations and requirements for the given component/element. The energy absorber can comprise any thermoplastic material or combination of thermoplastic materials that can be formed into the desired shape and provide the desired properties, e.g., a thermoplastic polyolefin (TPO). Exemplary materials include thermoplastic materials as well as combinations of thermoplastic materials with elastomeric materials, and/or thermoset materials. Possible thermoplastic materials include polybutylene terephthalate (PBT); acrylonitrile-butadiene-styrene (ABS); polycarbonate; polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride PVC; high impact polystyrene (HIPS); low/high density polyethylene (L/HDPE); polypropylene (PP); expanded polypropylene (EPP); polyethylene (PE); and thermoplastic olefins (TPO). For example, the bumper beam, energy absorber, and/or crash can can comprise Xenoy®, which is commercially available from SABIC Innovative Plastics IP B.V. The bumper beam, energy absorber, and/or crash cans can also be formed from combinations comprising at least one of any of the above-described materials.

The overall size, e.g., the specific dimensions of the energy absorber will depend upon its location in the vehicle and its function, as well as the particular vehicle for which it is intended. For example, the length (l), height (h), and width (w) of the energy absorbing assembly, will depend upon the amount of space available in the desired location of use as well as the needed energy absorption. The depth and wall thickness of the energy absorber will also depend upon the available space, desired stiffness, and the materials (or combination of materials) employed. For example, the wall thickness (t) of the energy absorber can be less than or equal to 4.0 mm, specifically, 0.5 mm to 1.5 mm, more specifically 0.5 mm to 1.0 mm, yet more specifically, 0.6 mm to 0.9 mm, and still more specifically, 0.6 mm to 0.8 mm.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 1B:
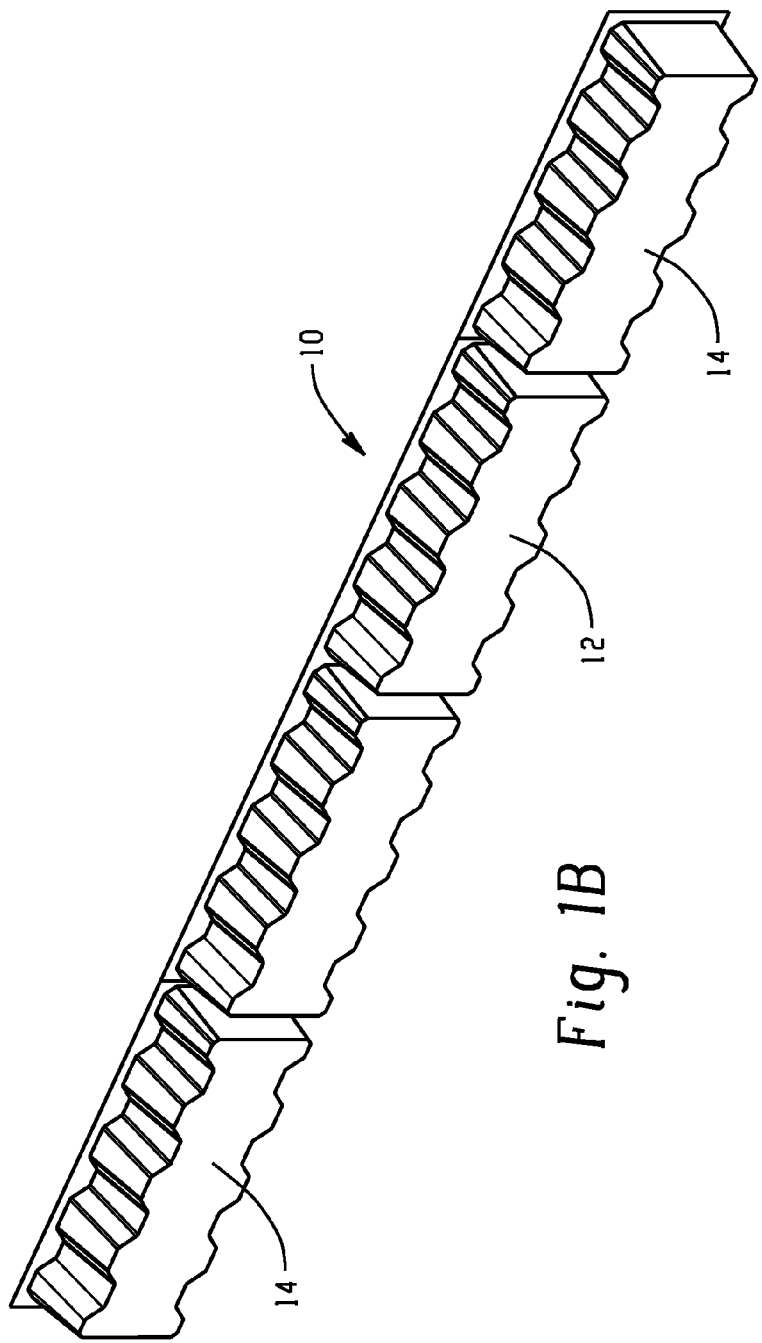
Figure 2:
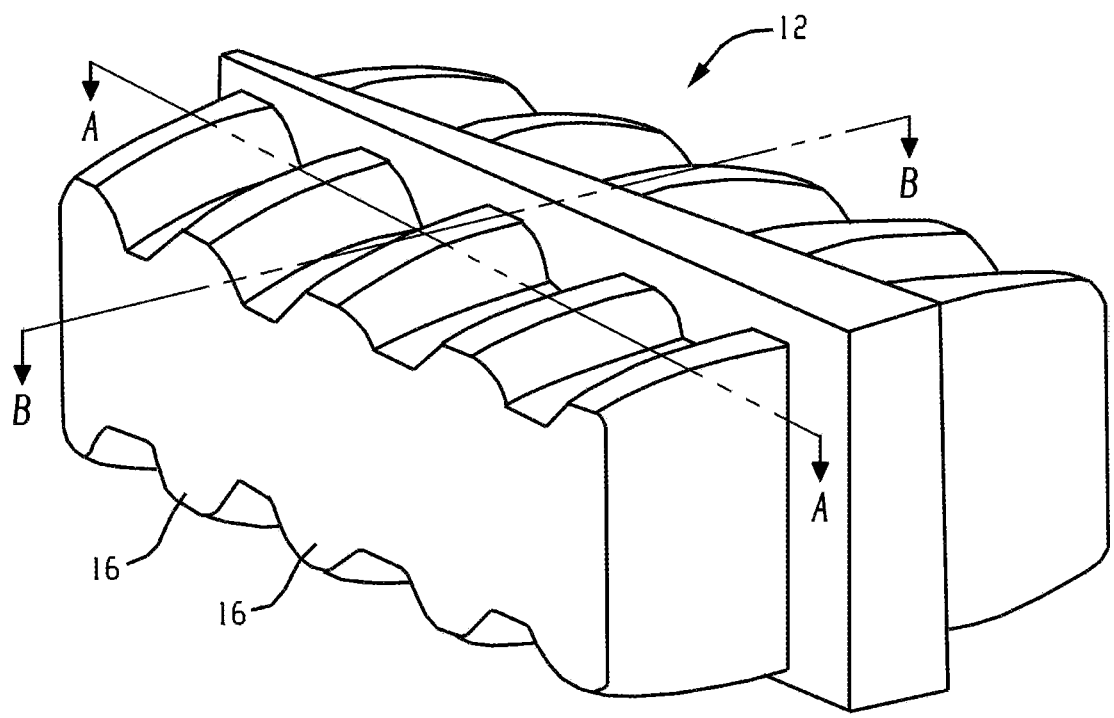
FIG. 2 is isometric view of an embodiment of blow molded inner lobes prior to separation.
Figure 3:
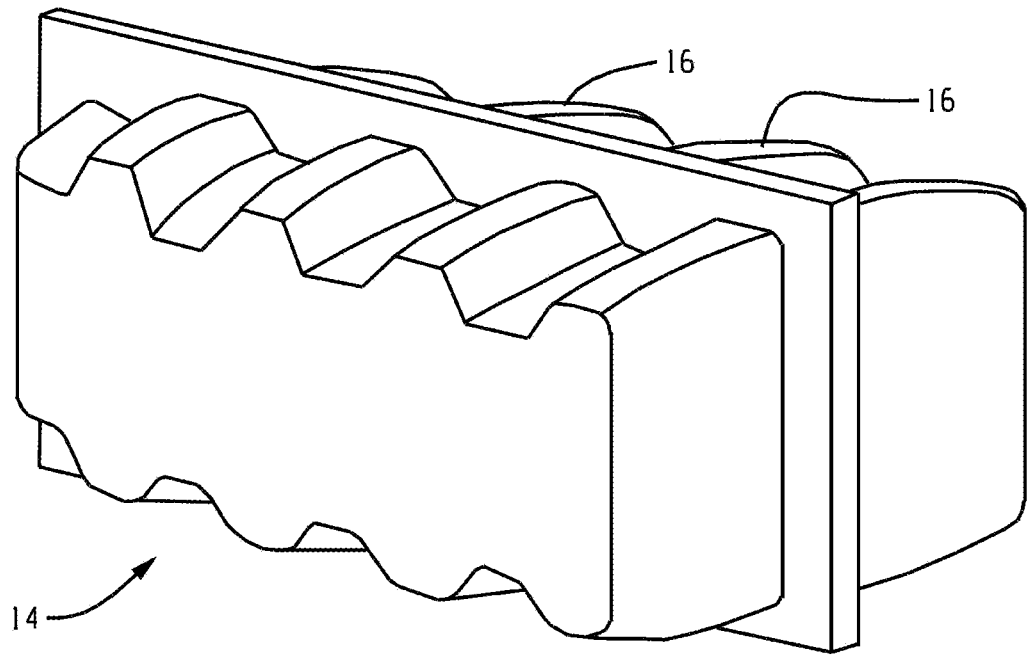
FIG. 3 is isometric view of an embodiment of blow molded outer lobe sections prior to separation.

FIG. 1 illustrates an energy absorber 10 comprising inner lobe section(s) 12 and outer lobe sections 14. FIG. 2 illustrates a view of an inner lobe section 12 and an outer lobe section 14. As can be seen from FIG. 2, both inner lobe section 12 and outer lobe section 14 comprise a closed structure that can be separated, partially or completely, into two halves to form the energy absorber 10. Also illustrated in FIG. 2, inner lobe section 12 and outer lobe section 14 each comprise a plurality of lobes 16 on the surface of the inner lobe section 12 or outer lobe section 14. The lobes enable the energy absorber to achieve high efficiency. For example, the energy absorber lobes can absorb lower leg impact energy about 500 Joules, in lesser packaging space (e.g., less than or equal to 45 mm). The inner lobe section 12 and outer lobe section 14 also each comprise fillets 18 comprising a radius (r). The radius of the fillets 18 can be less than or equal to 20 mm, specifically, less than or equal to 15 mm, more specifically 5 mm to 10 mm, and more specifically, 6 mm to 8 mm. The radius of the fillets 18 on the blow molded energy absorber enables the energy absorber thickness to be varied without increasing the overall weight of the energy absorber 10. For example, in one embodiment, the thickness of the lobes 16 can be different from that of the fillet radius r.

Therefore, these blow molded energy absorbers can have a thickness down to 0.5 mm, while injection molded energy absorbers, for example, have a thickness of greater than or equal to 1.8 mm due to processing limitations. The substantially thinner walls help in significant weight reduction possibilities. Compared to thermoformed energy absorbers, blow molding process offers greater design freedom (e.g., lesser fillet radius and/or thickness control), and helps in improving the performance.

The thickness of the lobe walls can be less than or equal to 4 mm, specifically, less than or equal to 1 mm, and even less than or equal to 0.8 mm. In some embodiments, different portions of the lobe section has different thicknesses, with all of the thicknesses being less than or equal to 1.5 mm.

Figure 4:
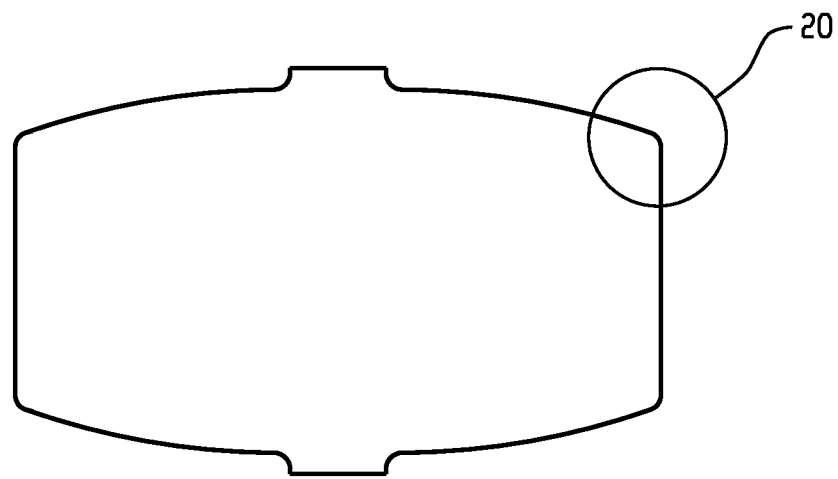
FIG. 4 is a cross-sectional schematic representation of blow molded inner lobes taken along lines B-B of FIG. 2.
Figure 5:
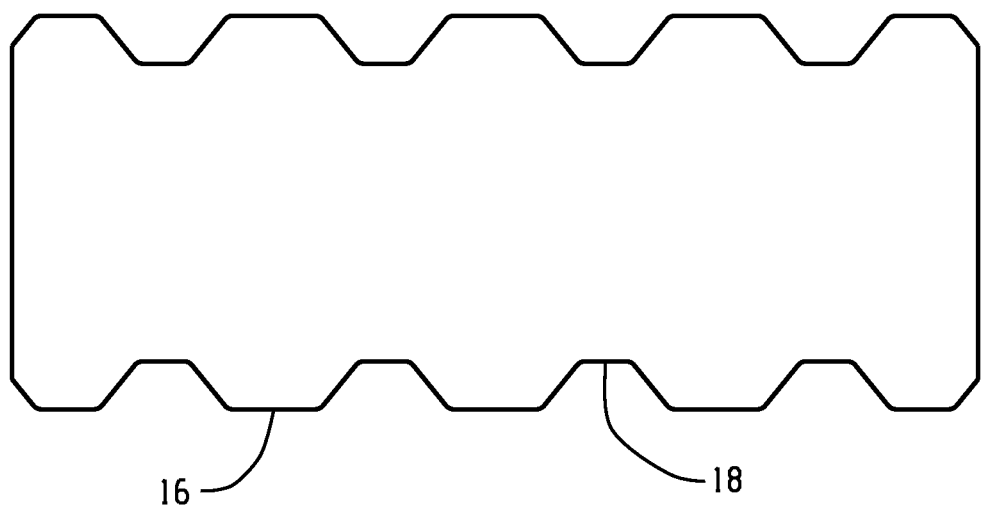
FIG. 5 is a cross-sectional schematic representation of blow molded inner lobes taken along lines A-A of FIG. 2.
Figure 8:
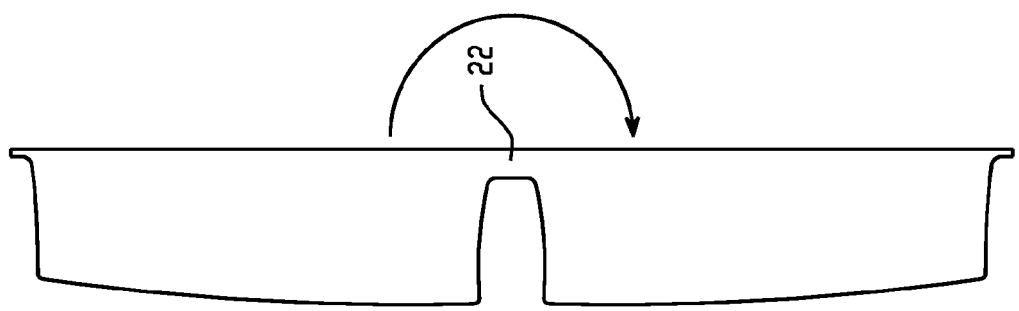
FIGS. 6-8 are side views of an embodiment of the method for producing the blow molded energy absorber inner lobes.
Figure 7:
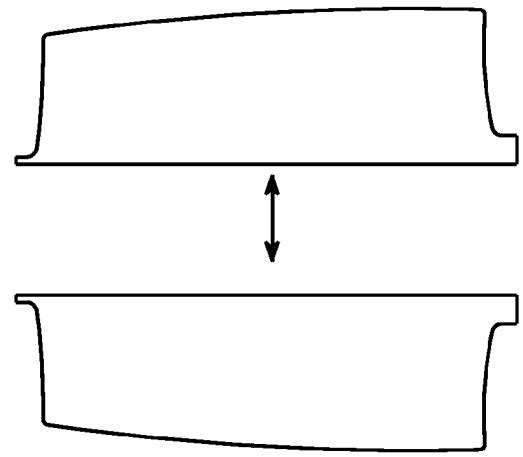
Figure 6:
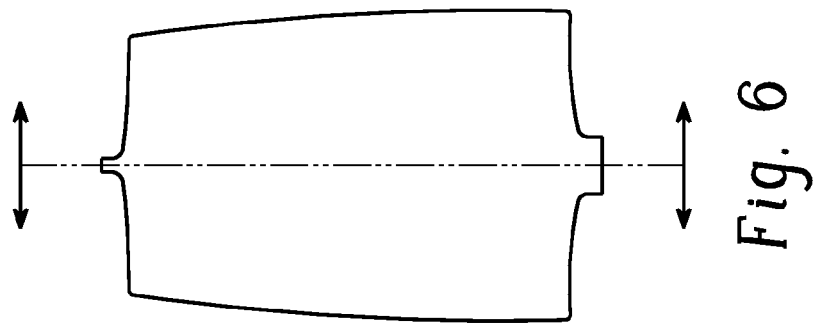
Figure 11:
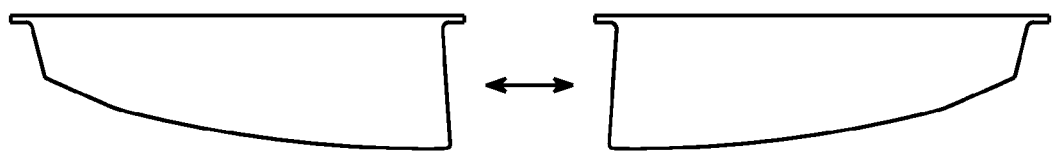
FIGS. 9-11 are side views of an embodiment of the method for producing the blow molded energy absorber outer lobe sections.
Figure 10:
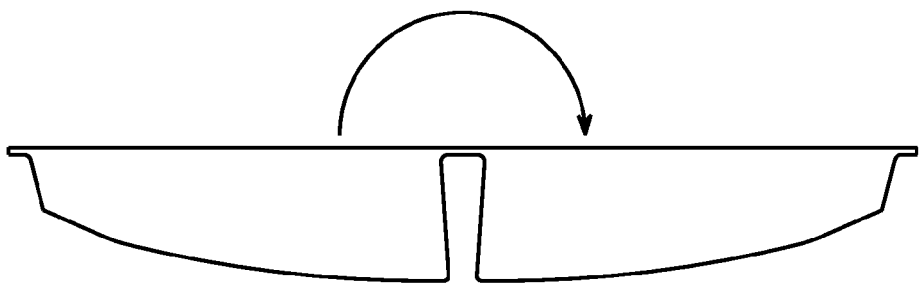
Figure 9:
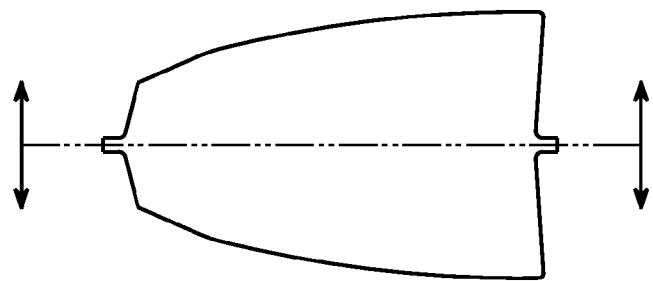

FIGS. 4 and 5 are cross-sectional illustrations of the inner lobe section taken along lines B-B and A-A, respectively of FIG. 2. FIGS. 5-8 illustrate the process of preparing the inner lobe section for attachment to a vehicle. As can be seen, the inner lobe section can be blow molded as a two-sided, mirror image (FIG. 6), which is separated, e.g., cut (FIG. 7). The cut can be all the way through the center line of the connected lobes, or can be sufficient to enable the lobes to rotate 180 degrees around a common connection point. Optionally, the inner lobes can be joined at connecting point 22 between adjacent sets of inner lobe sections. Similarly, the mirror image blow molded outer lobes (FIG. 9) can be separated, rotated (FIG. 10), and moved to the desired location with respect to the inner lobe sections (FIG. 11).

The inner and outer lobe sections can be attached to the vehicle via various methods such as mechanical attachments, e.g., screws, bolts, welding, snap features, clips, and so forth, as well as combinations comprising at least one of the foregoing.

Other blow molded, open energy absorber designs are also contemplated. For example, the energy absorber can be "tuned" to meet a specific crush characteristic by adjusting the fillets, crowning, thickness, and/or corrugations to absorb a desired amount of energy within the available package space of a particular vehicle. Hence, the energy absorber can comprise crowning, crush lobes separated by a base or wall, wherein the crush lobes can comprise crowning, corrugations, and/or fillets. Furthermore, the wall thickness can be adjusted. In some embodiments, lobes in different areas can have a different thickness (e.g., the outer lobe section versus the inner lobe section).

The energy absorber can be formed in various manners that comprise transforming a hollow, blow molded component comprising crush lobes into an open, blow molded energy absorber. For example, the method of making the energy absorbers can comprise introducing molten plastic to a mold configured as two of the lobe sections, blowing a gas into the plastic to cause the plastic to conform to the shape of the mold with a hollow inner cavity, removing the formed plastic, cutting the lobe sections to form mirror image lobe sections, and rotating a lobe section so that all lobes on both lobe sections extend in the same direction. Depending upon the particular design, one or multiple lobe sections are formed and arranged accordingly. For example, in FIGS. 6-11, separate inner and outer lobe sections are formed. The inner lobe section comprises two portions that are arranged adjacent to one another, with the outer lobe sections arranged on opposite ends of group of inner lobe sections. The specific number of inner lobe sections will depend upon the specific energy absorber design.

Figure 13:
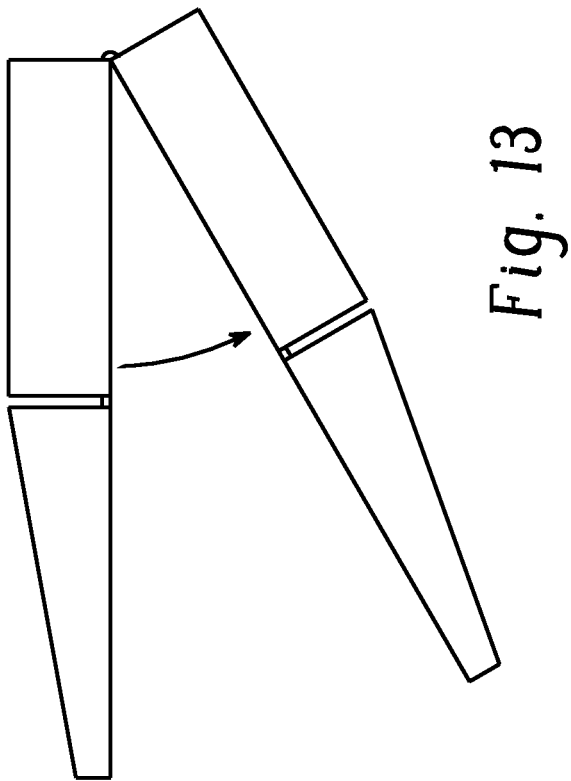
FIGS. 12-14 are a schematic side view of an embodiment of a method for producing the blow molded energy absorber.
Figure 12:
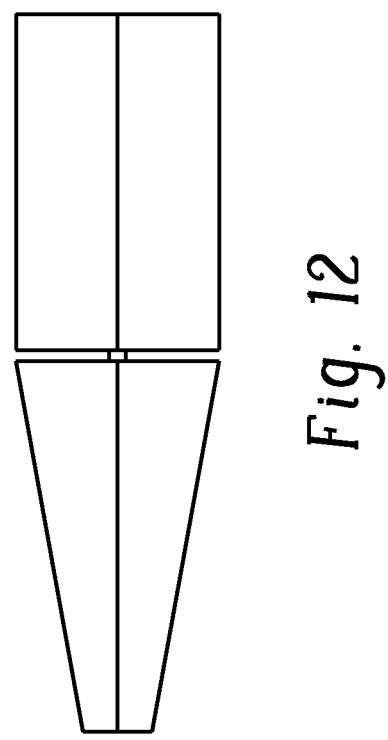
Figure 14:
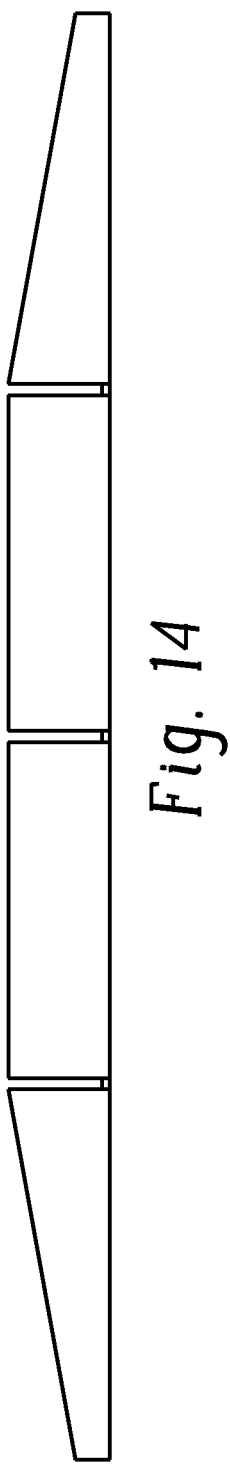

FIGS. 12-14 illustrate an embodiment wherein the inner and outer mold portions are formed as a single element such that the hollow, blow molded component (FIG. 12), is cut along the central axis, and the two pieces are unfolded (FIG. 13) to form the final energy absorber (FIG. 14). As can be seen in this design, a single blow molded hollow component is opened to form the final energy absorber. Here, the final energy absorber is a single unitary composition that was formed in situ.

Figure 15:
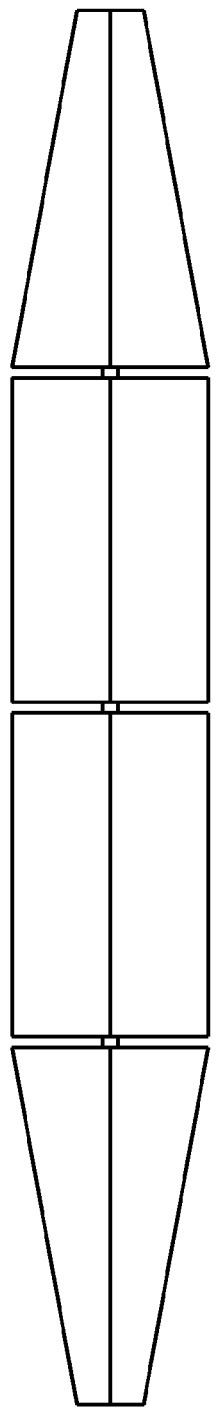
FIGS. 15-17 are a schematic side view of another embodiment of a method for producing the blow molded energy absorber.
Figure 16:
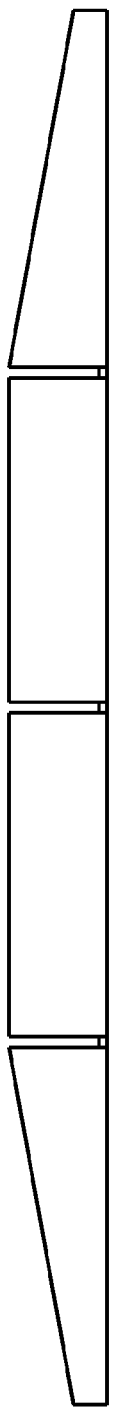
Figure 17:
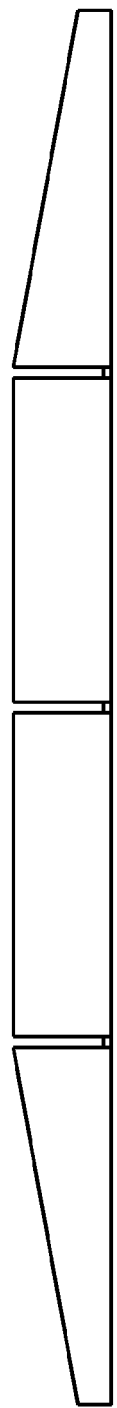

FIGS. 15-17 illustrate an embodiment wherein a single, hollow, blow molded element is opened (e.g., cut) along an axis to form the open blow molded energy absorber. As can be seen, in this embodiment, two energy absorbers can be formed from the single, hollow blow molded element.

Clearly, combinations of the above designs are also possible. For example, the inner lobe sections for two different energy absorbers can be formed from a single, hollow, blow molded element similar to FIG. 16, wherein the outer lobe sections can be formed separately and added, such as in FIGS. 9-11.

Once formed, the lobes can then be attached to a bumper beam or to a support and then to a bumper beam. Possible attachments include mechanical attachments (e.g., clamps, screws, bolts, snaps, welds, and/or the like), and chemical attachments (e.g., bonding agents and so forth).

The energy absorbing assembly is further illustrated by the following non-limiting examples. All of the following examples were based upon simulations unless specifically stated otherwise.

EXAMPLES

Example 1

Weight and Acceleration

Figure 18:
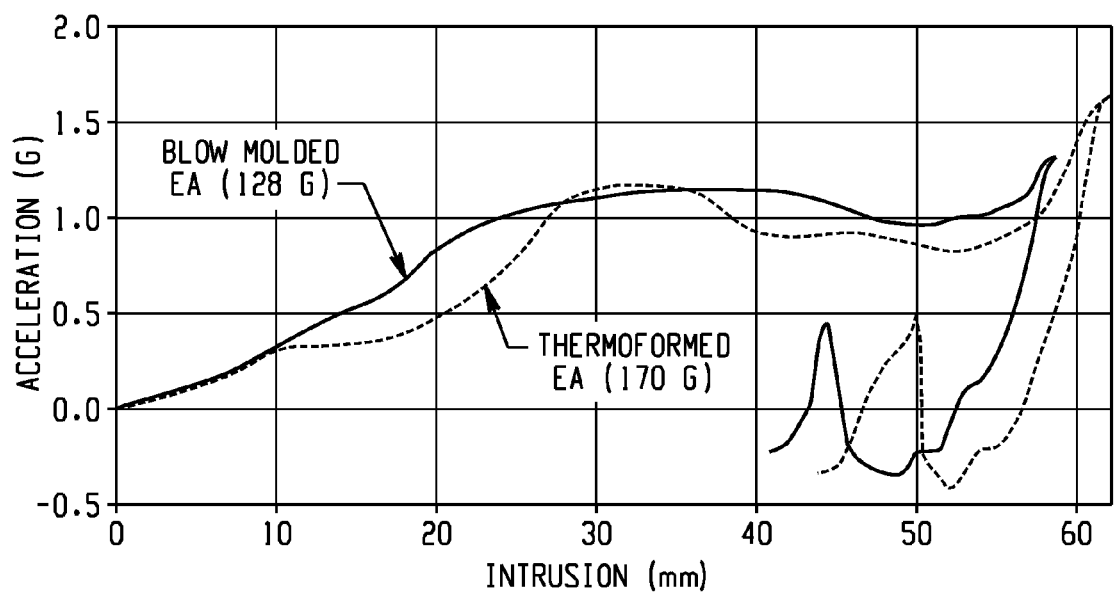
FIG. 18 is a graphical representation of acceleration (G) versus intrusion (mm) for energy absorbers formed by thermoforming versus energy absorbers having the same shape but formed by blow molding.

The complete energy absorber unit, assembled on a generic vehicle platform, is simulated and validated for two major impacts (lower-leg pedestrian impact and center pendulum impact as per United Nations Economic Commission for Europe (ECE-42) protocols). The complete blow-molding energy absorber weighed approximately 300 grams (g), significantly lighter compared to the existing injection molded thermoplastic solution (700 g) for the same packaging space. As illustrated in FIG. 18, the blow molded design is observed to perform 30% more efficiently than the thermoformed solution for a packaging space of 42 mm. With the present design a maximum acceleration of less than 150 G can be attained, specifically less than 140 G, and even less than 130 G, while the thermoformed energy absorber had a maximum acceleration exceeding 165 G. The present results were attained at a weight of less than 500 g.

Example 2

Pedestrian Lower Leg Impact

Figure 19:
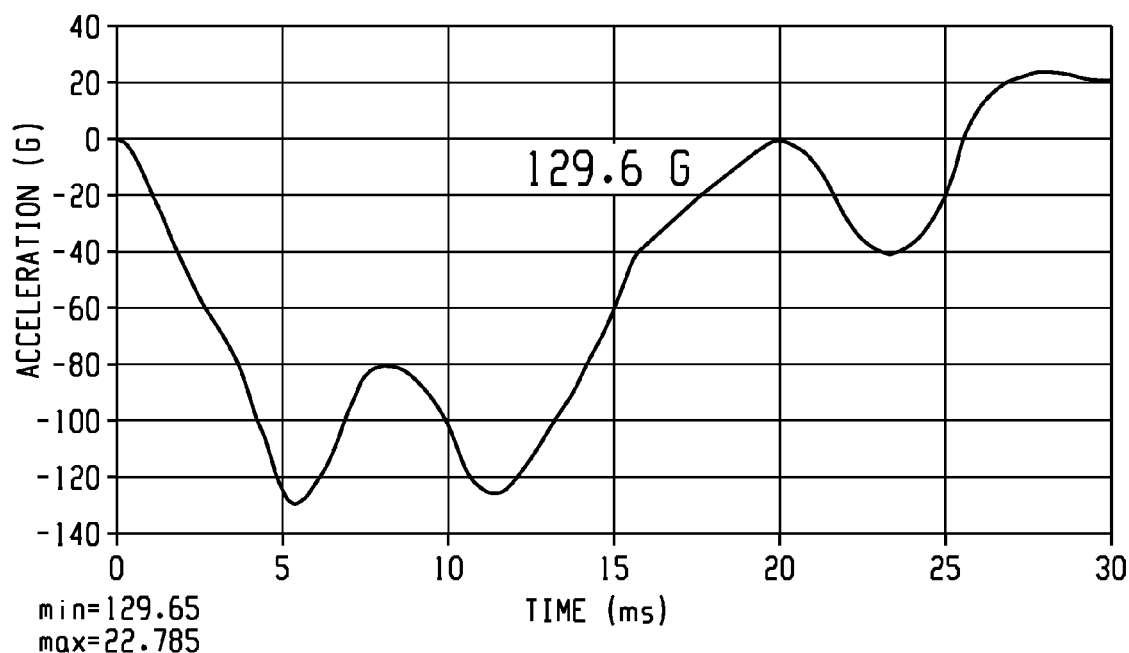
FIG. 19 is a graphical representation of force to the knee: acceleration (G) versus time.
Figure 20:
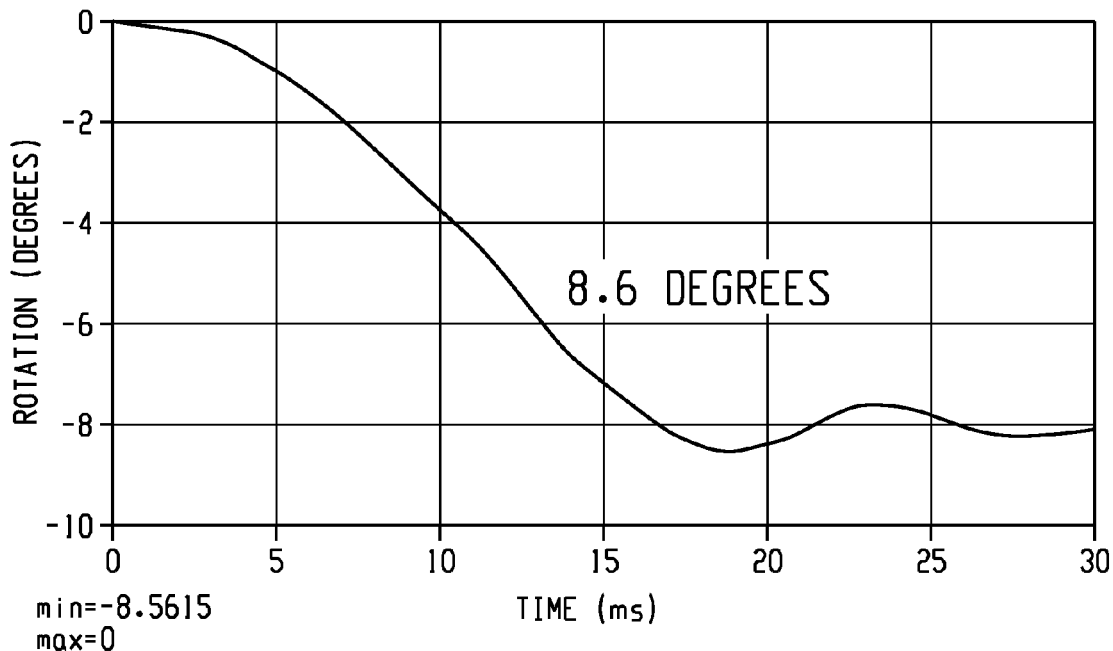
FIG. 20 is a graphical representation of force to the knee: rotation (deg) versus time.
Figure 21:
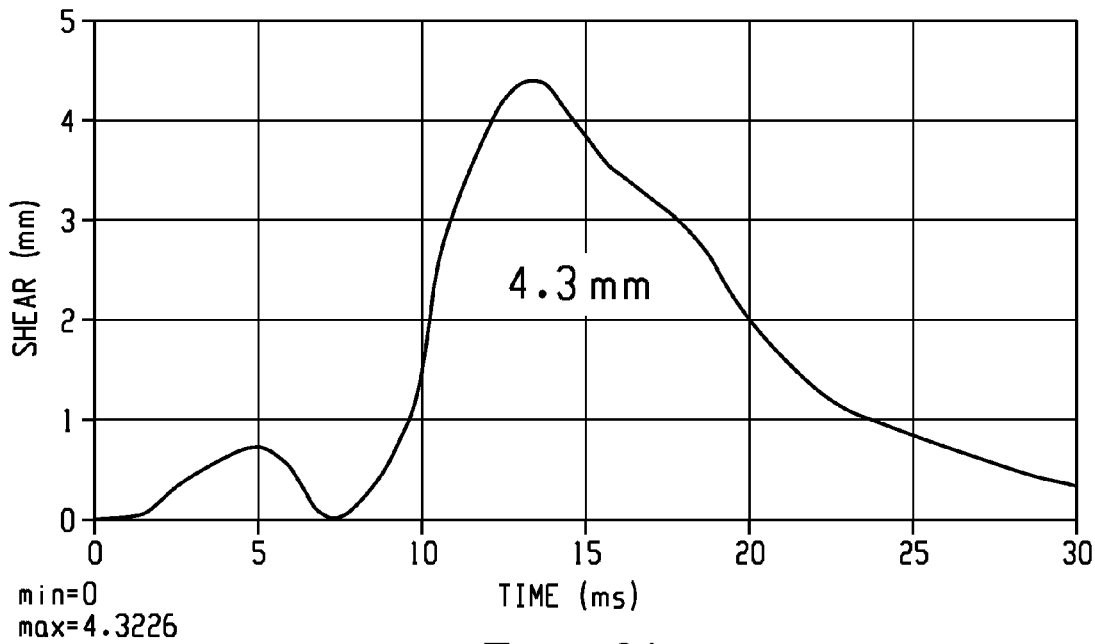
FIG. 21 is a graphical representation of force to the knee: shear (mm) versus time.

Regarding lower leg impact, a generic vehicle platform with a 3 mm thick polypropylene fascia, a glass filled lower spoiler, and a stiff member on the top to emulate the hood are used in conjunction with the blow molded energy absorber system. Here, the present blow molded energy absorber is found to meet all the lower-leg impact targets as per European Automobile Manufacturers' Association (ACEA,) Phase II protocols; namely acceleration of less than 150 G, rotation of less than 15 deg, and shear of less than 6 mm. Actually, the present design can attain an acceleration of less than or equal to 140 G, specifically less than or equal to 130 G. The present design can attain a rotation of less than or equal to 12 deg, specifically less than or equal to 10 deg. For shear, the present design can attain a result of less than or equal to 5 mm, specifically less than or equal to 4.5 mm. (See FIGS. 19-21)

Example 3

Center Pendulum Impact

Figure 22:
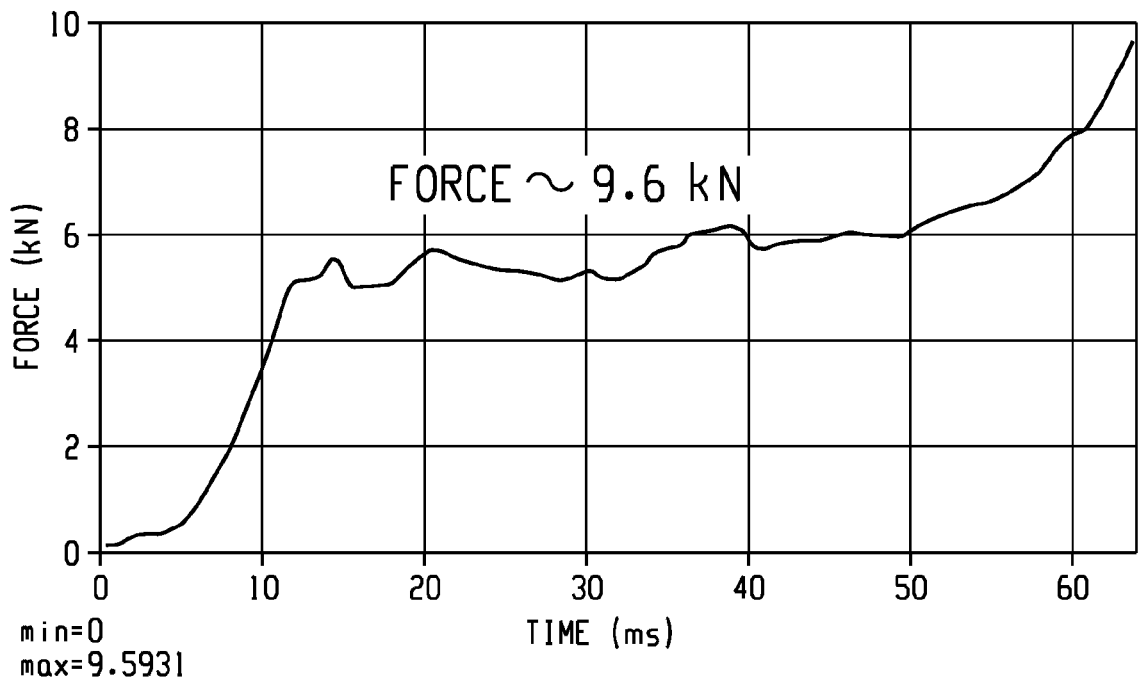
FIG. 22 is a graphical representation of force (kN) versus time (ms) for a pendulum impact.
Figure 23:
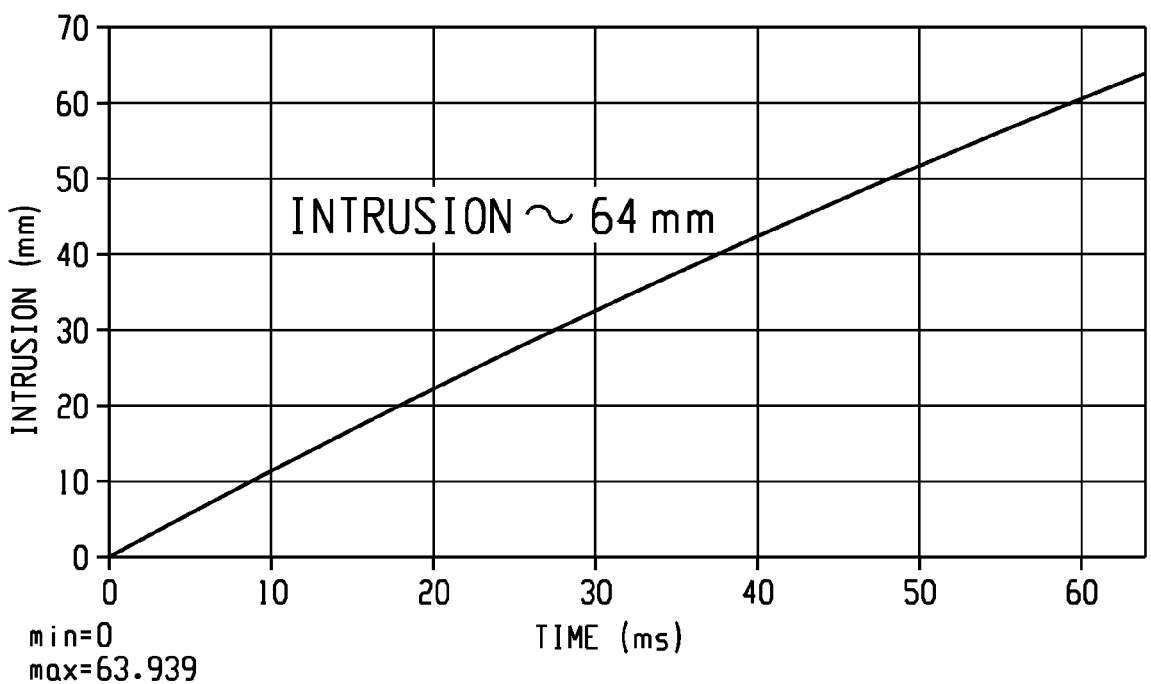
FIG. 23 is a graphical representation of intrusion (mm) versus time (ms) for a pendulum impact.

The present energy absorber system is also found to perform well for center pendulum impact (e.g., impact on the inner lobe sections), including meeting ECE-42 regulatory requirements. FIGS. 22 and 23 show the performance numbers for this impact case as force in kiloNewtons (kN) versus time in milliseconds (ms), and as intrusion in millimeters (mm) versus time (ms), respectively. As can be seen, for the period of 60 milliseconds, the force levels are maintained less than 15 kN and the intrusion levels are maintained at less than or equal to 64 mm. Actually, the force levels were maintained at less than or equal to 12 kN, and even less than or equal to 10 kN for the period of 60 ms.

The present design is a lightweight, highly efficient, blow-molded, pedestrian-safe, energy absorbing system for automobiles. The energy absorbing lobes for the entire energy absorber can be formed as a set of two which are separated to form the inner and outer lobe sections. Due to a lower thickness (e.g., less than 1.5 mm) a lighter weight energy absorber can be formed (e.g., less than 500 g), compared to thermoformed energy absorbers that have a thickness of greater than or equal to 2 mm due to process limitations that prevent the formation of thinner walls. Thermoformed energy absorbers have a weight of greater than 500 g and even greater than or equal to 700 g. However, the present blow molded energy absorber with a lighter weight and thinner wall, has better lower leg impact characteristics than the thermoformed energy absorber.

The present design and method forms open, blow molded energy absorber lobes that have a reduced thickness and/or fillet radius as compared to energy absorbers formed by other processes such as thermoforming and injection molding. As is understood, during blow molding, the formed component is a closed, hollow component. In the present design, that closed, hollow component is separated to form open components (e.g., components that have a cavity on one side; i.e., the side that was originally part of the inside of the hollow cavity). The open cavity can be located adjacent to a bumper beam or other support structure that will provide sufficient structural integrity to enable the crush lobes to crush in a desired manner during an impact.

In one embodiment, a blow molded energy absorber comprises: a blow molded first lobe section that has an open cavity on one side and first crush lobes; and a blow molded second lobe section that has been separated into open second preform portions that are located at opposite ends of the first lobe section; wherein the second lobe section comprises second crush lobes. The first crush lobes and the second crush lobes are on a first side of the energy absorber.

In another embodiment, a blow molded energy absorber comprises: blow molded crush lobes that are open on one side, wherein the energy absorber comprises fillets having a fillet radius of less than 20 mm and a thickness of less than or equal to 1.5 mm.

In one embodiment, a vehicle energy absorber system comprises: a bumper beam, a blow molded energy absorber, and a fascia. The energy absorber comprises a blow molded first lobe section that has an open cavity on one side, and first crush lobes; and a blow molded second lobe section that has been separated into open, second preform portions that are located at opposite ends of the first lobe section, wherein the second lobe section comprises second crush lobes. The first crush lobes and the second crush lobes are on a first side of the energy absorber. The energy absorber is located between the fascia and the bumper beam, with the open cavities on a side of the energy absorber adjacent the bumper beam.

In another embodiment, a vehicle energy absorber system, comprises: blow molded crush lobes that are open on one side, wherein the energy absorber comprises fillets having a fillet radius of less than 20 mm and a thickness of less than or equal to 1.5 mm; a bumper beam adjacent the open side; and a fascia, wherein the energy absorber is located between the fascia and the bumper beam.

In one embodiment, a method for making a blow molded energy absorber comprises: introducing a molten plastic to a first mold cavity; introducing gas into the plastic to conform the plastic to the interior of the first mold cavity and form a first preform; and separating the first preform along a centerline thereof to form open, first preform portions having first crush lobes.

In the various embodiments, (i) the first lobe section can be a single portion located between the second preform portions; and/or (ii) the first lobe section and/or the second lobe section can have a thickness of 0.5 mm to 1.5 mm; and/or (iii) the thickness can be 0.6 mm to 0.9 mm; and/or (iv) the first lobe section and/or the second lobe section can have fillets with a fillet radius of less than or equal to 15 mm; and/or (v) the fillet radius can be 5 mm to 10 mm; and/or (vi) the fillet radius can be 6 mm to 8 mm; and/or (vii) the first lobe section can comprise greater than or equal to two first preform portions having the same design.

In various embodiments, the method can comprise: (i) orienting the first preform portions adjacent to each other so that all of the first crush lobes are oriented in the same direction; and/or (ii) introducing a molten plastic to a second mold cavity; introducing gas into the plastic to conform the plastic to the interior of the second mold cavity and form a second preform; separating the second preform along a centerline thereof to form open, second lobe sections having second crush lobes; and locating one of the second lobe sections on opposite ends of an inner lobe portion comprising the first lobe section; wherein all of the crush lobes are oriented in the same direction; and/or (iii) attaching the first preform portion to a bumper beam.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to d one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed:

1. A method for making a blow molded energy absorber, comprising:
   introducing a molten plastic to a first mold cavity;
   introducing gas into the plastic to conform the plastic to the interior of the first mold cavity and form a first preform;
   separating the first preform along a centerline thereof to form open, first preform portions having first crush lobes; and
   orienting the first preform portions side by side so that all of the first crush lobes are oriented in the same direction.

2. The method of claim 1, further comprising attaching the first preform portion to a bumper beam.

3. The method of claim 1, wherein the energy absorber weighs less than 500 g, and wherein, when using a packaging space of less than 45 mm, and once assembled with a bumper beam, provides acceleration of less than 150 G, rotation of less than 15 degrees and shear of less than 6 mm in a pedestrian leg impact test.

4. The method of claim 1, wherein the energy absorber is capable of absorbing lower leg impact energy of about 500 Joules in a packaging space equal to or less than 45 mm.

5. A method for making a blow molded energy absorber, comprising:
   introducing a molten plastic to a first mold cavity;
   introducing gas into the plastic to conform the plastic to the interior of the first mold cavity and form a first preform;
   separating the first preform along a centerline thereof to form open, first preform portions having first crush lobes;
   introducing a molten plastic to a second mold cavity;
   introducing gas into the plastic to conform the plastic to the interior of the second mold cavity and form a second preform;
   separating the second preform along a centerline thereof to form open, second lobe sections having second crush lobes; and
   locating one of the second lobe sections on opposite ends of an inner lobe portion comprising the first lobe section;
   wherein all of the crush lobes are oriented in the same direction.

6. The method of claim 5, further comprising attaching the first preform portion to a bumper beam.

7. The method of claim 5, wherein the energy absorber weighs less than 500 g, and wherein, when using a packaging space of less than 45 mm, and once assembled with a bumper beam, provides acceleration of less than 150 G, rotation of less than 15 degrees and shear of less than 6 mm in a pedestrian leg impact test.

8. The method of claim 5, wherein the energy absorber is capable of absorbing lower leg impact energy of about 500 Joules in a packaging space equal to or less than 45 mm.

* * * * *